(12) United States Patent
Amini et al.

(10) Patent No.: US 11,394,863 B2
(45) Date of Patent: Jul. 19, 2022

(54) NO-REFERENCE IMAGE QUALITY ASSESSMENT FOR ITERATIVE BATCH VIDEO ANALYSIS

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/669,249

(22) Filed: Oct. 30, 2019

(65) Prior Publication Data
US 2020/0084367 A1 Mar. 12, 2020

Related U.S. Application Data

(63) Continuation-in-part of application No. 16/562,322, filed on Sep. 5, 2019, now abandoned.

(60) Provisional application No. 62/727,941, filed on Sep. 6, 2018.

(51) Int. Cl.
*H04N 5/232* (2006.01)
*G06T 7/00* (2017.01)
*G08B 13/196* (2006.01)

(52) U.S. Cl.
CPC ....... *H04N 5/23206* (2013.01); *G06T 7/0002* (2013.01); *H04N 5/23225* (2013.01); *G06T 2207/10016* (2013.01); *G06T 2207/30168* (2013.01); *G08B 13/1966* (2013.01)

(58) Field of Classification Search
CPC ............ H04N 5/23206; H04N 5/23225; G06T 7/0002; G06T 2207/30168; G06T 2207/10016; G08B 13/1966; G08B 13/196
See application file for complete search history.

(56) References Cited

U.S. PATENT DOCUMENTS

| | | | |
|---|---|---|---|
| 2016/0080692 A1* | 3/2016 | Hsu | H04N 21/6175 |
| | | | 348/14.08 |
| 2016/0284095 A1* | 9/2016 | Chalom | G06K 9/627 |
| 2017/0061214 A1* | 3/2017 | Huang | H04N 5/23232 |
| 2018/0167620 A1 | 6/2018 | Li et al. | |
| 2019/0228540 A1* | 7/2019 | Citerin | G06T 7/11 |
| 2019/0261243 A1* | 8/2019 | Amini | H04L 43/0858 |
| 2019/0288911 A1* | 9/2019 | Amini | H04L 43/08 |
| 2019/0313024 A1* | 10/2019 | Selinger | H04N 5/23206 |
| 2020/0221009 A1* | 7/2020 | Citerin | H04N 5/23222 |

OTHER PUBLICATIONS

International Search Report and Written Opinion dated Jan. 21, 2021 for PCT Application No. PCT/US20/58349, 9 pages.

* cited by examiner

*Primary Examiner* — Shahbaz Nazrul
(74) *Attorney, Agent, or Firm* — Perkins Coie LLP

(57) ABSTRACT

Introduced here are technologies for examining content generated by electronic devices in real time to optimize the quality of the content. The content may be examined in batches to address some of the drawbacks of real-time analysis. For instance, a series of videos may be examined to collect data on how well security system(s) that are presently employed are working. Each security system can include one or more electronic devices, such as cameras or microphones, and parameters of the electronic devices can be altered to improve the quality of content generated by the electronic devices.

20 Claims, 11 Drawing Sheets

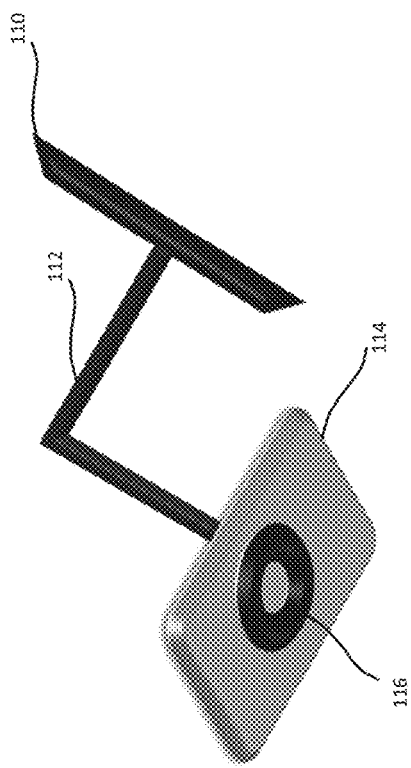
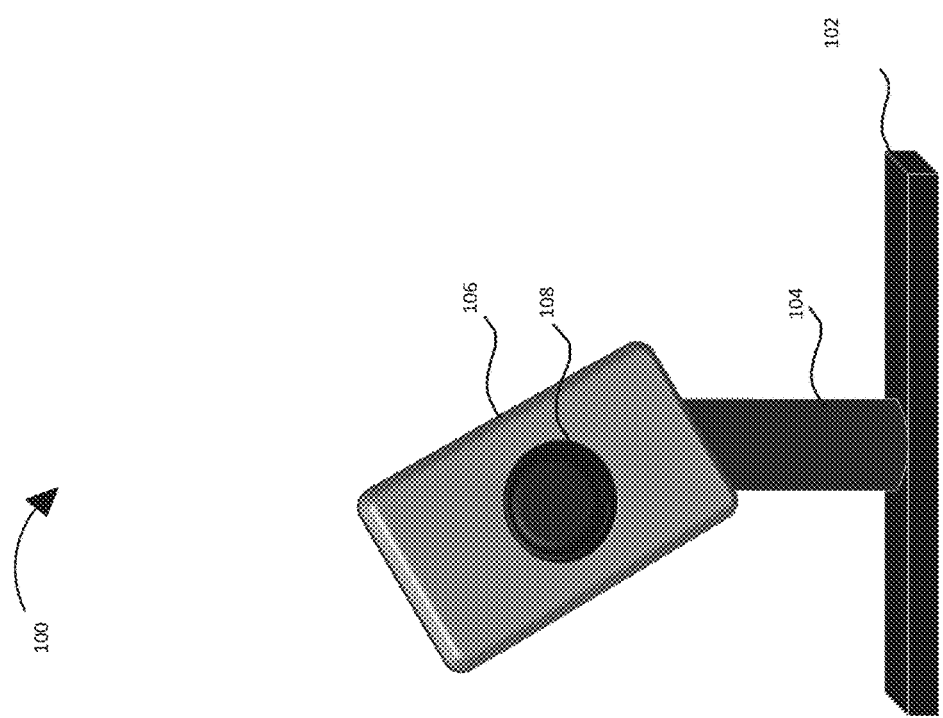
FIG. 1

NO-REFERENCE IMAGE QUALITY ASSESSMENT FOR ITERATIVE BATCH VIDEO ANALYSIS

CROSS-REFERENCE TO RELATED APPLICATIONS

This application is a continuation-in-part of U.S. application Ser. No. 16/562,322, titled "No-Reference Image Quality Assessment for Video Analysis" and filed on Sep. 5, 2019, which claims priority to U.S. Provisional Application No. 62/727,941, titled "No-Reference Image Quality Assessment for Video Analysis" and filed on Sep. 6, 2018, each of which is incorporated herein by reference in its entirety.

TECHNICAL FIELD

Various embodiments concern computer programs and associated computer-implemented techniques for assessing quality of the content generated by electronic devices such as security cameras, security lights, etc.

BACKGROUND

Surveillance is the monitoring of behavior, activities, or other changing information for the purpose of influencing, managing, or protecting people/items in a given environment. Generally, surveillance requires that the given environment be monitored by means of electronic devices such as security cameras, security lights, etc. For example, a variety of electronic devices may be deployed to detect activities performed in/around a home.

Surveillance systems (also referred to as "security systems") have historically included one or more cameras that were connected to a digital video recorder (DVR) via a hardwired connection. These cameras suffered from several drawbacks, and chief among them was the difficulty in deploying these cameras within an environment to be observed. Accordingly, entities have begun developing wireless cameras in an effort to address some of these drawbacks. Wireless cameras have proven to be very popular among consumers due to their low installation costs and flexible installation options. Moreover, many wireless cameras can be mounted in locations that were previously inaccessible to wired cameras. Thus, consumers can readily set up security systems for seasonal monitoring/surveillance (e.g., of pools, yards, garages, etc.).

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 1 depicts a variety of electronic devices that can be used to monitor the home environment.

Figure 2A:
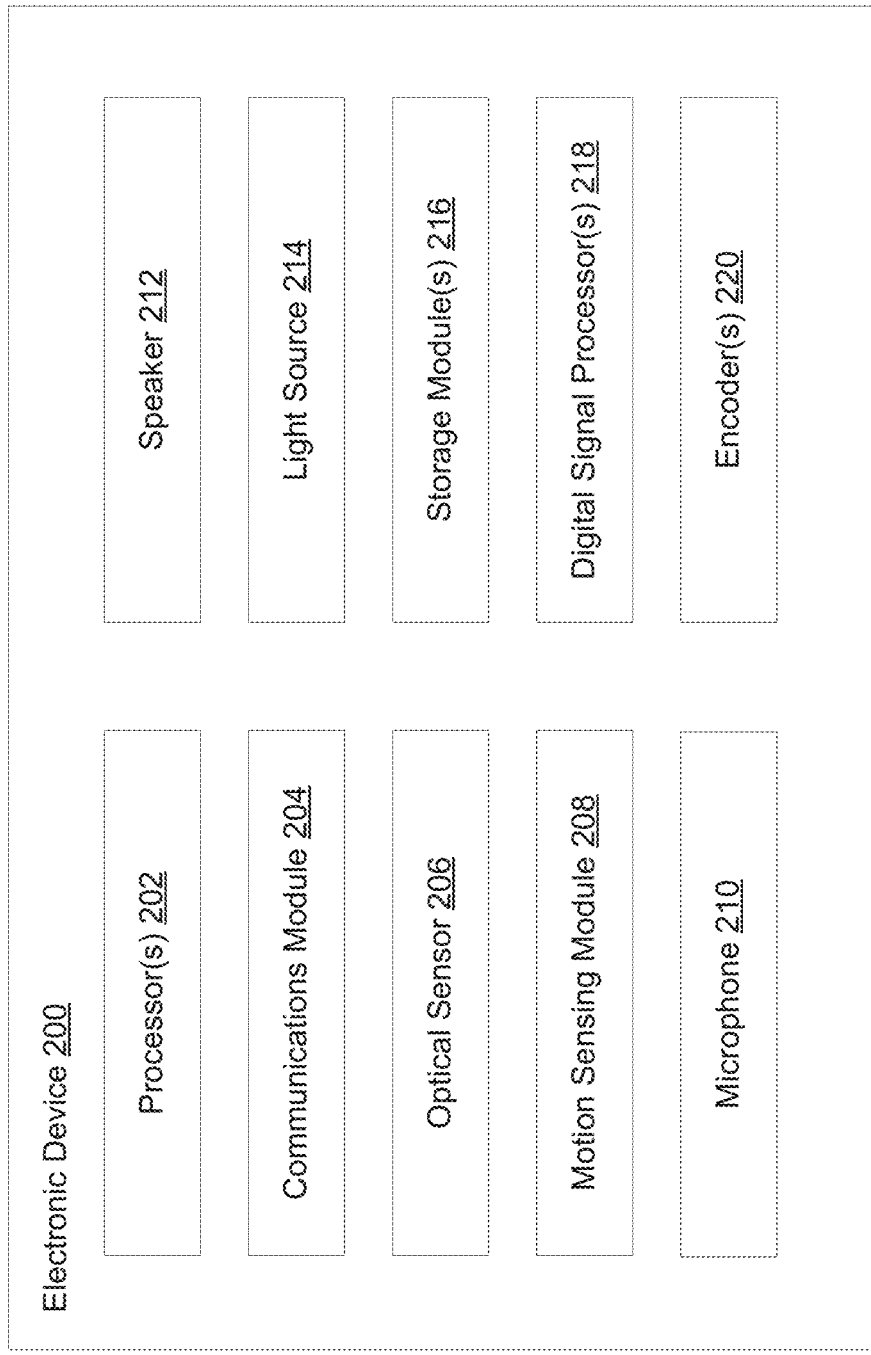
FIG. 2A is a high-level functional block diagram illustrating the architecture of an electronic device that monitors various aspects of a surveilled environment.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Surveillance may require that a given environment be monitored by means of various electronic devices, such as security cameras, security lights, etc. For instance, a surveillance system (also referred to as a "security system") designed to observe a home environment may include a base station that is communicatively coupled to camera(s), security light(s), video doorbell(s), audio doorbell(s), etc. At least some of these components may be connected to a computer server via a network. For instance, the base station may be able to communicate with the computer server via the Internet. Content generated by a security system may be examined locally (i.e., by the security system itself) and/or remotely (e.g., by the computer server).

Generally, a network-connected security system includes a base station and one or more electronic surveillance devices. These electronic component(s) may collectively be referred to as the "hardware subcomponents" of the security system. The electronic surveillance device(s) can be configured to monitor various aspects of an observed environment. For example, cameras may be configured to record video upon detecting movement, while security lights may be configured to illuminate the observed environment upon detecting movement. Different types of electronic surveillance devices can create different types of content. Here, for example, the cameras may generate audio data and/or video data, while the security lights may generate metadata specifying a time at which each illumination event occurred, a duration of each illumination event, etc.

The base station, meanwhile, may be responsible for transmitting the content generated by the electronic surveillance device(s) to a network-accessible computer server. Thus, each electronic surveillance device may provide data to the base station, which in turn provides at least some of the data to the network-accessible computer server.

Nowadays, security systems may support features such as high-quality video recording, live video streaming, two-way audio transmission, cloud-based storage of recordings, instant alerts, etc. These features enable individuals to gain an in-depth understanding of what activities are occurring within the environment being observed or surveilled. However, security systems having these features also experience challenges.

For example, one challenge is to generate high-quality videos using the available memory, processing power, and bandwidth of the surveillance system. To generate high-quality videos, however, the security system should assess the quality of videos generated by the security system that will be viewed by an administrator (also referred to as a "user" or "customer"). Based on the assessed quality, the security system can determine whether to make changes in parameters used by the hardware subcomponents. For example, if the videos do not meet the quality threshold, re-optimization operations may be performed during post-processing of those videos. Due to the vast amount of video generated by a security system, however, the videos cannot be evaluated manually. Additionally, there is no reference video representative of the ideal quality of videos to be presented to the administrator.

Introduced here, therefore, are several different solutions for addressing these drawbacks. First, content generated by the hardware subcomponent(s) of a security system can be analyzed in batches. As further discussed below, batch analysis may be performed by a base station, a network-connected computer server, or any combination thereof. The hardware subcomponents distributed throughout various environments may collect millions of files (e.g., video clips, audio clips, metadata) each day, and these files can be analyzed (e.g., by the base station of each security system, or computer server(s) connected to these security systems) in batches.

More specifically, these files can be analyzed for collecting data on how well the corresponding security systems work, so that the adjustable parameters of the electronic devices responsible for generating the files can be improved by the network-connected computer server. Results of such analysis can be rolled into parameters, software modules, etc., which may be pushed to base stations for distribution to the electronic devices. Alternatively, these parameters, software modules, etc., may be pushed directly to the electronic devices. For example, when battery is a significant concern, the network-connected computer server may periodically provide updated parameters to the (powered) base station, which can then push the updated parameters to any local electronic devices for implementation with minimal energy consumption.

In some embodiments, these adjustable parameters are optimized based on the characteristics of a single surveillance environment. Said another way, these parameters may be adjusted on an individual basis. In other embodiments, these adjustable parameters are optimized based on the characteristics of multiple surveillance environments. These surveillance environments may represent all surveillance environments known to the network-connected computer server. Alternatively, these surveillance environments may be associated with a cohort that includes the administrator. The cohort can include administrators that share a characteristic in common, such as geographical location, natural lighting levels, surveillance system topology (e.g., arrangement of electronic devices), etc. Accordingly, adjustable parameters may be optimized by the network-connected computer server for an electronic device based on characteristics of the administrator's surveillance environment and/or characteristics of other administrators' surveillance environments.

Second, near real-time analysis of content generated by electronic devices can be performed by a base station, network-connected computer server, or any combination thereof. In some embodiments, the network-connected computer server is one of multiple network-connected computer servers that form a server system. The server system may balance the load amongst the multiple network-connected computer servers (e.g., by intelligently distributing images for processing) to ensure the verification process is completed with low latency.

Third, a no-reference image quality assessment system is provided. Image quality assessment allows for adjustments or updates in parameters that are used by the surveillance to generate video data with improved quality. If quality is not met in a statistically significant number of videos, re-optimization may be done in video lab. The no-reference image quality assessment system may include a training period and a subsequent period that uses data from the training period to assess the quality of the recorded video. The assessed quality of the recorded video is then used to adjust the parameters for improving the quality of subsequently recorded video.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components.

Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 depicts a variety of electronic devices that can be used to monitor the home environment. Examples of such electronic devices include security lights (e.g., the Arlo Security Light), security cameras (e.g., the Arlo Ultra, Arlo Pro 3, Arlo Pro 2, Arlo Pro, Arlo Go, or Arlo Baby), audio/video recorders (e.g., Arlo Video Doorbell, or Arlo Audio Doorbell), etc.

Wall(s) 102 and 110 can function as the mounting area for the camera system. Other functional equivalents can also be used as the mounting area, such as doors, cabinets, or windows. Support structure(s) 104 and 112 are used to support the camera structure(s) 106 and 114. Camera(s) 108 and 116 are used to surveil the environment. Other surveillance devices can be implemented onto camera structure(s) 106 and 114 or be incorporated within camera(s) 108 and 116, such as light sources, motion detectors, speakers, microphones, etc.

These electronic devices can be configured to generate different types of content. For example, security cameras may generate video data responsive to a determination that movement has been detected. As another example, audio recorders may generate audio data responsive to a determination that movement has been detected. As another example, security lights may generate metadata specifying a time at which each illumination event occurred, a duration of each illumination event, etc., responsive to a determination that movement has been detected. Therefore, while the term "content" may be used to refer to video content below, those skilled in the art will recognize that the term "content" includes any data that can be generated by these types of electronic devices.

FIG. 2A is a high-level functional block diagram illustrating the architecture of an electronic device 200 that monitors various aspects of an observed or surveilled environment. As further described below, the electronic device 200 may generate content while monitoring the observed or surveilled environment, and then transmit the content to a base station (e.g., base station 250 of FIG. 2B) for further review.

The electronic device 200 (also referred to as a "recording device") can include one or more processors 202, a communication module 204, an optical sensor 206, a motion sensing module 208, a microphone 210, a speaker 212, a light source 214, one or more storage modules 216, digital signal processor(s) 218, and encoder 220.

The processor(s) 202 can execute instructions stored in the storage module(s) 216, which can be any device or mechanism capable of storing information. In some embodiments a single storage module includes multiple computer programs for performing different operations (e.g., image recognition, noise reduction, filtering), while in other embodiments each computer program is hosted within a separate storage module.

The communication module 204 can manage communication between various components of the electronic device 200. The communication module 204 can also manage communications between the electronic device 200 and a base station, another electronic device, etc. For example, the communication module 204 may facilitate communication with a mobile phone, tablet computer, wireless access point (WAP), etc. As another example, the communication module 204 may facilitate communication with a base station responsible for communicating with a network-connected computer server. More specifically, the communication module 204 may be configured to transmit content generated by the electronic device 200 to the base station for review. As further described below, the base station may examine the content itself or transmit the content to the network-connected computer server for examination.

The optical sensor 206 (also referred to as "image sensors") can be configured to generate optical data related to the observed or surveilled environment. Examples of optical sensors include charged-coupled devices (CCDs), complementary metal-oxide-semiconductors (CMOSs), infrared detectors, etc. In some embodiments, the optical sensor 206 is configured to generate a video recording of the observed or surveilled environment responsive to, for example, determining that movement has been detected within the observed environment. In other embodiments, the optical data generated by the optical sensor 206 is used by the motion sensing module 208 to determine whether movement has occurred. The motion sensing module 208 may also consider data generated by other components (e.g., the microphone) as input. Thus, an electronic device 200 may include multiple optical sensors of different types.

The optical sensor detects light qualities that correspond to a pixel of the generated image. The detection occurs for a predetermined period depending on factors such as the desired frames per second and the shutter speed (e.g., 20 microsecond of 100 microsecond). During that period, the detected light properties are converted to a voltage. In some examples, the voltage indicates a property of the pixel, such as the lumens or color.

Parameters applied to the optical sensor determines how the voltage signal is read and processed. For example, the voltage signal may be amplified before they are read. Additionally, the sensor may use a set of parameters for a day mode and another set of parameters for a night mode. The night mode parameters take into account the fact that there is very low energy and color information in night-time recordings. Due to the relatively low energy of night recordings, the voltage signal amplitude is relatively low and must be amplified. When then signal is amplified, noise becomes more pronounced. Additionally, pixels may be combined to gather more information per signal.

The optical sensor 206 may be in communication with a digital signal processor (DSP) 218. The DSP is a microprocessor that executes algorithms to filter, compress, or otherwise process analog signals. For example, a DSP may receive the detected voltage signal from the optical sensor 2016. After processing by the DSP 218, the signal may be output to a video encoder for encoding.

The encoder 220 is used to convert digital video data from one format to another. Some encoders may include a reference frame and an interframe. The reference frame is a video frame that is used to predict future video frames. The interframe is a frame that is expressed in terms of one or more neighboring frames. This is accomplished by using inter-frame predictions based on the data of the reference frame. For example, the H.264 and H. 265 encoding standards use iframes as an interframe. An encoder builds a predictive model of the image, and then produces a video based upon the prediction. This process is performed according to various parameters that can be adjusted to provide different outputs.

There are challenges associated with video encoding. The video data may include data that requires a lot of data storage but the quality of the data itself may not be important to the overall quality of the video. For example, the video may capture a tree in a windy environment. The video may include a lot of data to capture the movement of each individual leaf in the wind. The data required to capture this video would be prohibitive in terms of data storage and data transmission. In this example, the encoder may adjust its parameters to blur the video data of the tree in order to reduce the amount of data to store and transmit.

In some embodiments, the currently configured parameters may not be suitable for a dynamically changing scene. For example, a person may walk in front of the trees and approach the surveilled area. If the encoder is using parameters that blurs the trees, the same parameters will also blur the face of the approaching individual. The result is that the video would not provide a clear image of the approaching individual that would be necessary for identification. Additionally, parameters that meet the needs of one viewer may not meet the need of other viewers. For example, different viewers may have different data storage and data transmission bandwidth constraints. Different viewers may also have different latency requirements. To address this challenge, the encoder may use parameters that correspond to different types of scenes. Each type of scene may be associated with a set of parameters. Additionally, the encoder may provide different parameters for different administrators by optimizing parameters after deployment of the encoder.

Due to the vast number of scenes that different cameras may encounter, one set of parameters optimized for one scene may not be optimized for a different scene. Therefore, it is advantageous to determine different parameters for different scenes, different cameras, and/or different administrators. The parameters that may be modified for the image sensor may include the exposure, aperture, analogue gain, and digital gain. The parameters that may be modified for the image signal processor may include gamma encoding, auto focus, sharpness, color temperature, mapping colors and noise filters. The parameters that may be modified for the infrared LED may include different light levels and motion for different scenes. Finally, the codec parameters that may be modified include bit rates, profiles, and quantization parameters for different levels of motion.

The microphone 210 can be configured to record sounds within the surveilled environment. The electronic device 200 may include multiple microphones. In such embodiments, the microphones may be omnidirectional microphones designed to pick up sound from all directions. Alternatively, the microphones may be directional microphones designed to pick up sounds coming from a specific direction. For example, if the electronic device 200 is intended to be mounted in a certain orientation (e.g., such that the camera 208 is facing a doorway), then the electronic device 200 may include at least one microphone arranged to pick up sounds originating from near the point of focus.

The speaker 212, meanwhile, can be configured to convert an electrical audio signal into a corresponding sound that is projected into the surveilled environment. Together with the microphone 210, the speaker 212 enables an individual located within the surveilled environment to converse with another individual located outside of the surveilled environment. For example, the other individual may be a homeowner who has a computer program (e.g., a mobile application) installed on her mobile phone for monitoring the surveilled environment.

The light source 214 can be configured to illuminate the surveilled environment. For example, the light source 214 may illuminate the surveilled environment responsive to a determination that movement has been detected within the surveilled environment. The light source 214 may generate metadata specifying a time at which each illumination event occurred, a duration of each illumination event, etc. This metadata can be examined by the processor(s) 202 and/or transmitted by the communication module 204 to the base station for further review.

Embodiments of the electronic device 200 may include some or all of these components, as well as other components not shown here. For example, if the electronic device 200 is a security camera, then some components (e.g., the microphone 210, speaker 212, and/or light source 214) may not be included. As another example, if the electronic device 200 is a security light, then other components (e.g., the camera 208, microphone 210, and/or speaker 212) may not be included.

Figure 2B:
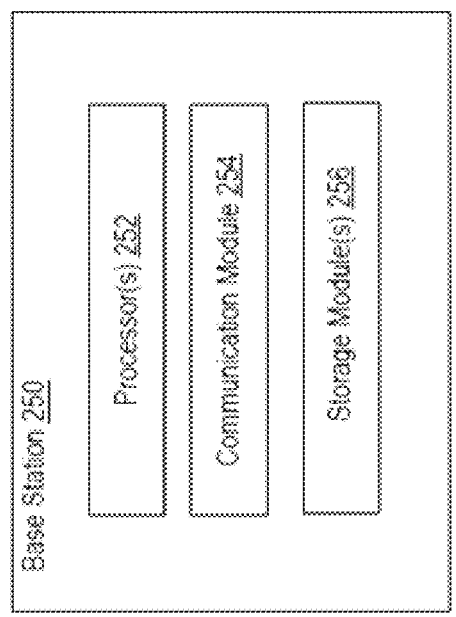
FIG. 2B is a high-level functional block diagram illustrating a base station configured to process content generated by electronic devices, forward the content to a network-connected computer server, etc.

FIG. 2B is a high-level functional block diagram illustrating a base station 250 configured to process content generated by electronic devices (e.g., electronic device 200 of FIG. 2A), forward the content to a network-connected computer server, etc.

The base station 250 can include one or more processors 252, a communication module 254, and one or more storage modules 256. In some embodiments a single storage module includes multiple computer programs for performing different operations (e.g., image recognition, noise reduction, filtering), while in other embodiments each computer program is hosted within a separate storage module. Moreover, the base station 250 may include a separate storage module for each electronic device within its corresponding surveillance environment, each type of electronic device within its corresponding surveillance environment, etc.

Such a categorization enables the base station 250 to readily identify the content/data generated by security cameras, security lights, etc. The content/data generated by each type of electronic devices may be treated differently by the base station 250. For example, the base station 250 may locally examine sensitive content/data but transmit less-sensitive content/data for examination by a network-connected computer server.

Thus, in some embodiments the base station 250 examines content/data generated by the electronic devices to better understand what events are occurring within the surveilled environment, while in other embodiments the base station 250 transmits the content/data to a network-connected computer server responsible for performing such analysis.

The communication module 254 can manage communication with electronic device(s) within the surveilled environment and/or the network-connected computer server. In some embodiments, different communication modules handle these communications. For example, the base station 250 may include one communication module for communicating with the electronic device(s) via a short-range communication protocol, such as Bluetooth® or Near Field Communication, and another communication module for communicating with the network-connected computer server via a cellular network or the Internet.

Figure 3:
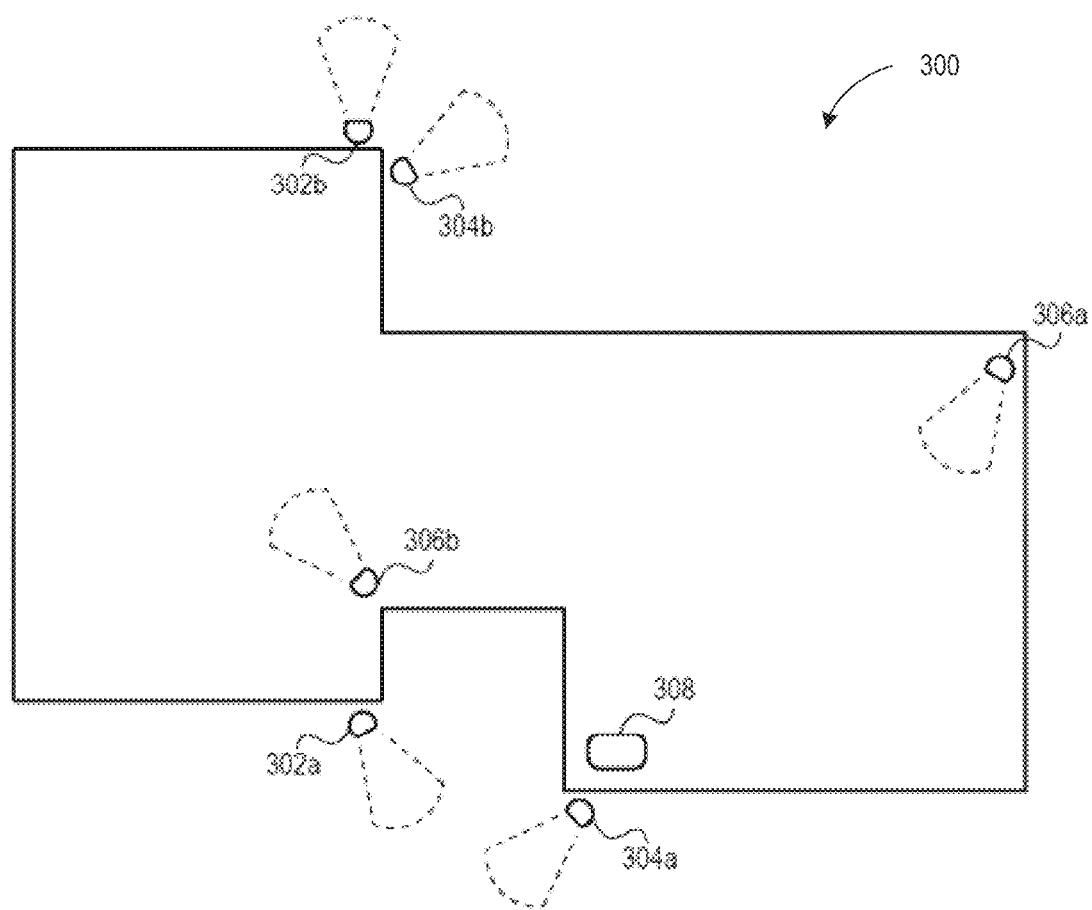
FIG. 3 depicts a network environment that includes a variety of electronic devices configured to collectively monitor a surveilled environment (e.g., a home).

FIG. 3 depicts a network environment 300 that includes a variety of electronic devices configured to collectively monitor a surveilled environment (e.g., a home). Here, the variety of electronic devices includes multiple security lights 302a-b, multiple external security cameras 304a-b, and multiple internal security cameras 306a-b. However, those skilled in the art will recognize that the network environment 300 could include any number of security lights, security cameras, etc.

Some or all of these electronic devices can be communicatively coupled to a base station 308 that located in or near the surveilled environment. Each electronic device can be connected to the base station 208 via a wired communication channel or a wireless communication channel.

Figure 4A:
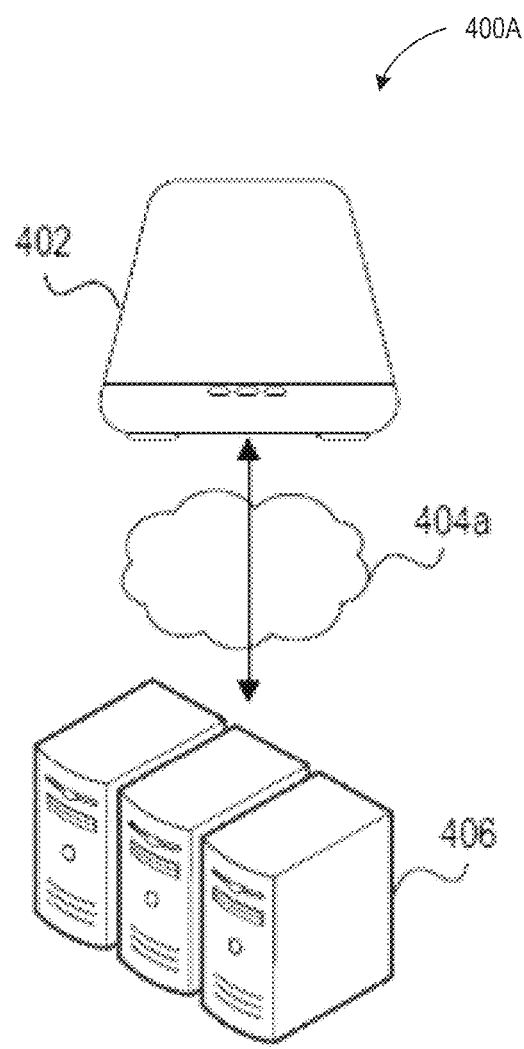
FIG. 4A illustrates a network environment that includes a base station designed to receive content generated by one or more electronic devices arranged throughout a surveilled environment.

FIG. 4A illustrates a network environment 400a that includes a base station 402 designed to receive content generated by one or more electronic devices arranged throughout a surveilled environment. The base station 402 can transmit at least some of the content to a network-accessible server system 406. The network-accessible server system 406 may supplement the content based on information inferred from content uploaded by other base stations corresponding to other surveilled environments.

The base station 402 and the network-accessible server system 406 can be connected to one another via a computer network 404a. The computer network 404a may be a personal area network (PAN), local area network (LAN), wide area network (WAN), metropolitan area network (MAN), cellular network, the Internet, etc.

Figure 4B:
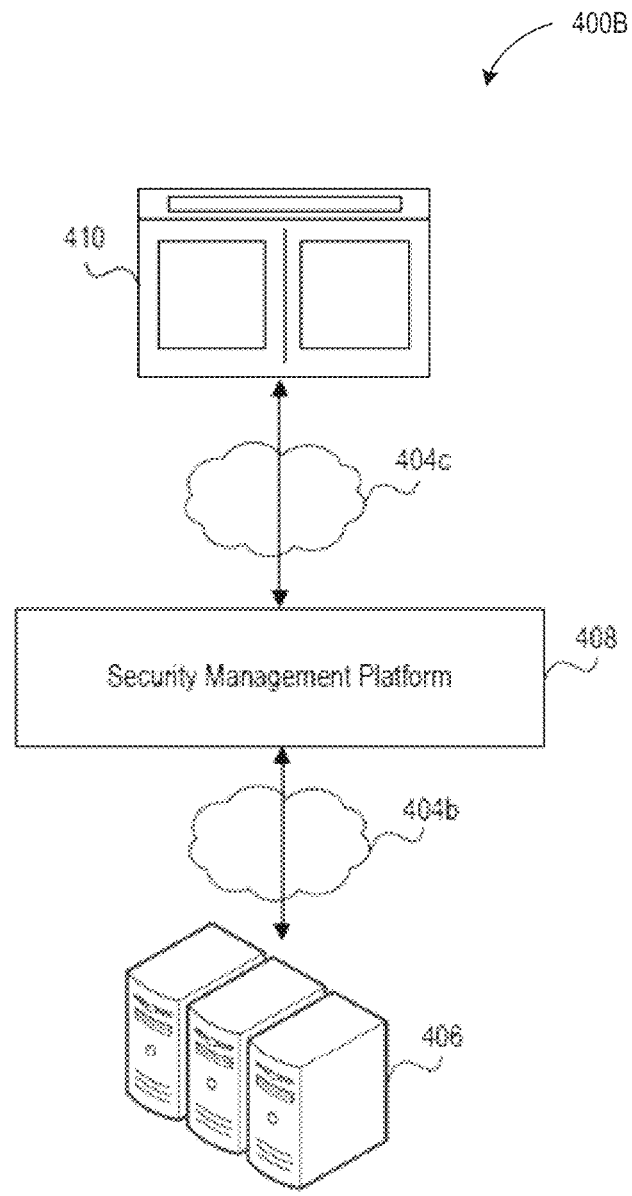
FIG. 4B illustrates a network environment that includes a security management platform that is supported by the network-accessible server system.

FIG. 4B illustrates a network environment 400b that includes a security management platform 408 that is supported by the network-accessible server system 406. Individuals can interface with the security management platform 408 via an interface 410. For example, a homeowner may examine content generated by electronic devices arranged proximate her home via the interface 410.

The security management platform 408 may be responsible for parsing content/data generated by electronic device(s) arranged throughout a surveilled environment to detect occurrences of events within the surveilled environment. The security management platform 408 may also be responsible for creating interface through which an individual can view content (e.g., video clips and audio clips), initiate an interaction within someone located in the surveilled environment, manage preferences, etc.

As noted above, the security management platform 408 may reside in a network environment 400b. Thus, the security management platform 408 may be connected to one or more networks 404b-c. Similar to network 404a, networks 404b-c can include PANs, LANs, WANs, MANs, cellular networks, the Internet, etc. Additionally or alternatively, the security management platform 408 can be communicatively coupled to computing device(s) over a short-range communication protocol, such as Bluetooth® or NFC.

The interface 410 is preferably accessible via a web browser, desktop application, mobile application, or over-the-top (OTT) application. Accordingly, the interface 410 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Figure 5:
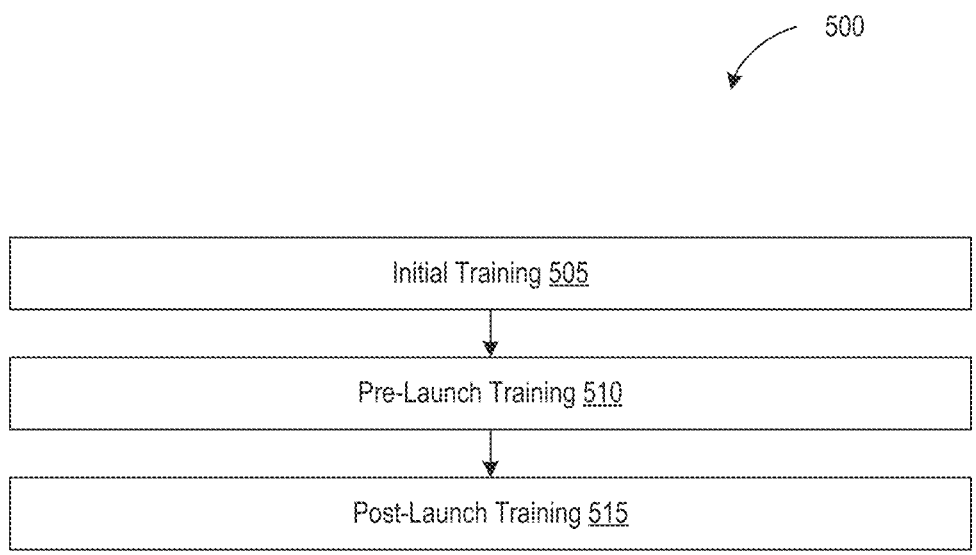
FIG. 5 is a flowchart of a technique for performing training steps of the network-connected surveillance system.

FIG. 5 depicts a flow diagram of a process 500 for optimizing optimize the quality of content generated by a hardware subcomponent of a security system. The process 500 can be applied to a network-connected surveillance system which includes a base station and one or more electronic devices. The electronic device(s) can be configured to monitor various aspects of a surveilled environment. For example, the electronic device(s) may include security camera(s) that generate a series of files (e.g., video clips) over time. The security camera(s) may be placed in a diverse variety of environments (e.g., indoors, outdoors, daytime recording, nighttime recording, changing climate conditions, interference such as animals entering the recorded area, etc.). Therefore, it is important to provide parameters that determine the operation of the camera such that the parameters optimize the quality of the recorded videos.

Moreover, to provide high-quality videos, it is important to evaluate the video quality that customers are receiving. If the recorded videos do not meet the video-quality threshold, re-optimization may be performed by readjusting the operational parameters. Such parameters may include, for example, optical parameters, image processing parameters, or encoding parameters. Examples of optical parameters are focal length, lens distortion, aperture, exposure times, etc. Examples of image processing parameters are sharpness, distortion, vignetting, lateral chromatic aberration, noise, etc. Examples of encoding parameters are compression types, bitrate, frame rates, etc.

Despite the need for re-optimization, a large amount of video may be generated across a plurality of security cameras over a long duration of time. Therefore, it is difficult to manually assess the quality of all the videos.

To address the issues discussed above, the process 500 involves multiple steps to train the network-connected surveillance system. The system can perform various steps at different phases of the deployment of the system to adjust the parameters used by the system. In step 505, the initial training may be done in an iterative manner and in a facility that simulates different scenes. Scenes include outdoor, indoor, day, different lighting, night, etc. The iterative training may be performed before the components of the network-connected surveillance system are produced. At this step, the system may be under development and not been deployed to administrators or customers. The system may be implemented on a development board with a larger amount of processing power and memory than is available in a deployed system. The higher amount of processing power and memory allows the system to process a larger amount of data than is available on a deployed system. In particular, large amounts of reference frames are compared with corresponding frames encoded by the encoder. By comparing the reference frames to the encoded frames, reference-based tweaking can be performed on the parameters. The parameters are tweaked such that the encoded frames have similar parameters as the reference frames. The comparison and tweaking may be performed offline and not in real time. Once the training is performed, parameters may be implemented into the manufactured components.

Additionally, in step 505, the system can utilize various models or methods to evaluate the quality of the videos. A method is a collection of algorithms or data that allows for subjective evaluation. A model is, for example, a collection of video data or parameters that permit comparison with the data and parameters of another video. Various video quality assessment methods and models can employ a high-quality file (e.g., a processed file) or a raw file as a reference that is compared against a recorded video. For example, the Mean-Squared Error (MSE) measures the average squared difference between actual and ideal pixel values. This metric is simple to calculate but does not align closely with the human perception of quality. The peak Signal-to-Noise Ratio (pSNR) is derived from the mean square error, and indicates the ratio of the maximum pixel intensity to the power of the distortion. Like MSE, the pSNR metric is simple to calculate but does not align closely with perceived quality.

The Structural Similarity (SSIM) index metric combines local image structure, luminance, and contrast into a single local quality score. In this metric, structures are patterns of pixel intensities, especially among neighboring pixels, after normalizing for luminance and contrast. Because the human visual system is good at perceiving structure, the SSIM quality metric agrees more closely with the subjective quality score associated with a human perception of quality.

Furthermore, a model designed to assess the quality of videos may be blind/reference-less. Under such a model, a high-quality file (e.g., a processed file) or a raw file is used as a reference to compare against a recorded video. The advantage of blind/reference-less models is that it can be applied in situations where a reference is not available. For example, in a surveillance system configured to generate videos, there isn't a ground truth reference for what the recorded video should look like for every possible environment, condition, etc.

Generally, a reference-less model can be pixel-based, parametric- or bitstream-based, or a hybrid of previously mentioned methods. In pixel-based methods, the system uses a decoded representation of the data and analyzes the pixels for video characteristics such as blurriness, data compression, or other distortions. In parametric- or bitstream-based methods, the system analyzes the container format of the transmission and storage of the video data. In this method, the system does not utilize the original or final signal, only the transmission container. In a hybrid model, the system applies both the above-mentioned models.

One reference-less method is a Blind/Reference-less Image Spatial Quality Evaluator (BRISQUE) model. The BRISQUE model is trained by using a database of security videos with known distortions. The model uses scene statistics to quantify possible losses of quality in the image due to the presence of distortions. The method may be limited to evaluating the quality of images with the same type of distortion. A subjective quality score accompanies the training image may be applied in order for BRISQUE to be opinion-aware.

Another reference-less method is a Natural Image Quality Evaluator (NIQE) model. The NIQE model is trained on a database of pristine images. NIQE can measure the quality of images containing arbitrary distortion. NIQE does not use subjective quality scores so it is opinion-unaware and easier to train. In some cases, the tradeoff is that the NIQE score of an image might not correlate as well as the BRISQUE score with human perception of quality. In some embodiments, the network-connected surveillance system may use the BRISQUE model, the NIQE model, or a combination of the two models.

By iteratively evaluating the quality of the video recordings, the network-connected surveillance system can apply parameter settings that result in video recordings of higher quality. These parameter settings can then be pushed out to electronic devices as updated. For example, the analytics system can transmit updated parameter(s) to one or more base stations that are responsible for relaying the updated parameter(s) to security cameras as necessary.

These updates could be provided on a more personalized basis. For example, the analytics system may identify those security cameras in similar surveilled environments based on ambient light level, event frequency, the presence of pets and/or children, geographical location, etc. In such embodiments, the analytics system may only transmit updated parameter(s) to those base stations corresponding to security cameras in similar surveilled environments. Such action ensures that security cameras in dissimilar surveilled environments (e.g., brightly lit backyards compared to dimly lit alleys) do not receive the same updated parameter(s).

In some embodiments these parameters are updated on a periodic basis (e.g., daily, weekly, or monthly), while in other embodiments these parameters are updated on an ad hoc basis. For example, these parameters may be updated when receiving a request to do so from an administrator, receiving an indication the corresponding electronic device has been deployed in a new surveilled environment, etc.

In other embodiments, the analytics systems may form profiles for regularly surveilled environments based on ambient light, event frequency, geographic location of the camera, environmental characteristics, etc. Additionally, the analytics system may form a profile based on the Internet Protocol ("IP") address of the network or device (i.e., camera(s), or user device(s)) to get the geographical location of a device. The profiles can contain quality metric values, that provide for optimal video data. In such embodiments, the analytics system may transmit the previously optimized parameters to those base stations corresponding to security cameras in regularly surveilled environments. For example, if the analytics system recognizes, by assessing the ambient light, geographic location, etc., that a camera is currently surveilling a previously surveilled living room, the analytics system will update the parameters of the camera to the previously optimized settings for the living room.

In step 510, the second phase of training can employ various methods of training. In one embodiment, the system can use any of the video quality assessment methods used in pre-launch steps 505 and 510 and mentioned herein (e.g., BRISQUE, MSE, NIQE, etc.). In another embodiment, the camera system can be deployed to a group of beta testers that mimic the use of future users of the camera system. The beta users may be trained specifically to identify characteristics of recorded video data to determine the image quality recorded by individual security cameras. For example, the group of testers may be a group of one hundred beta testers. The beta testers may deploy the encoder to capture actual video data. The beta testers review the provided videos to determine the performance of the encoders. This review is used as feedback to update the parameters and thresholds of the camera system to improve its performance.

In step 515, post launch training may use a variety of optimization methods such as feedback from trained users, filtered feedback from large numbers of customers and consumers, image quality evaluation models, or a combination thereof. This may occur after the network-connected surveillance system has been sold and implemented at a customer site.

For example, this step may use natural training. The training addresses problems with the video data that is being generated at a camera. One challenge that the system may encounter is that the generated image is blurry. The blurriness is likely associated with optical sensor performance or with the encoding performed by the encoder. The encoder may determine that some scenes capture a large amount of motion involving many pixels. One scene may only have 10% of pixels that have movement, while another scene may have 80% of pixels that have movement. Scenes with high percentage of pixels with movement may exhibit more blurriness.

A scene with a lot of motion may need to be encoded with a large quantity of data. For example, the encoder may use 10 megabits per second to record the large amount of details. Since the large amount of data may exceed the budget of data allowed by the system (e.g., constraints due to memory or bandwidth capacity), the encoder will need to reduce the bit rate for subsequent data in the scene to compensate. However, rapid changes in the bit rate encoding may result in video that is clearly defined for a period and then abruptly becomes blurry. To address this problem, the system may specifically limit the bit rate of video data encoded to under 10 megabits per second. Similarly, the system may limit the rate of change of the bit rate such that the encoded video does not drastically fluctuate in quality.

Encoding parameters may be defined for each individual camera. Additionally, parameters may be defined for different types of scenes. For example, parameters may be defined for day scenes and different parameters may be set for night scenes. In further detail, parameters may be defined for different times of the day to account for changing conditions such as lighting and wind. Some of the parameters associated with the sensor include luminance, color, and contrast. Additionally, a rate control algorithm may be used to moderate the adjustment of bit rates as described above.

The third step may also involve a natural scene statistics (NSS) model. The NSS model assumes that natural images possess certain regular statistical properties. Captured distortions in a recorded video will change the statistics property of natural images. Therefore, the key idea of NSS-based metrics is to quantify the image quality degradations by measuring the losses of "naturalness." In some embodiments, the features of a recorded video are extracted using the NSS models.

Then, the extracted features are used to train a learning model by mapping the extracted features to subjective scores. Then, the quality of subsequent recorded videos is predicted using the trained model. In some embodiments, evaluating statistical data may be executed by using the NIQE and/or BRISQUE models. The models determine that a normal image or an image with desirable qualities has a certain distribution. When an image has a distribution that is significantly different, then the evaluation reveals that the image is not normal or has undesirable qualities. The evaluators require a training period to first establish or assign scores to statistical data of reference images. Once the training is complete, the evaluator can use the assigned scores to determine the quality of evaluated images.

The statistical data involves processing an image and describing the image in terms of the statistical distribution of certain characteristics. For example, the statistical distribution may be a distribution representing the luminance, contrast, or blurriness of the pixels in an evaluated image. If the statistical distribution of the blurriness of an image is significantly different from a normal blurriness distribution, then the image may be excessively blurry.

For example, the evaluator may determine that the video is excessively blurry. This may occur when there is a large amount of motion in the surveilled area. To remedy the blurriness, the system may have to increase the bit rate. However, due to memory constraints, the camera may alternate between a high bit rate and a lower bit rate. This may result in low quality video for the time period with a lower bit rate.

To address or prevent low quality images due to drastic changes in the blurriness of recorded videos, the encoder may be adjusted to moderate the rate control such that a video stream is encoded without drastic bit rate changes. The rate control may be moderated by setting parameters such as the max bit rate and/or target bit rate. Quantization Parameters for the reference frame and delta frame may also be set.

Additionally, the camera may adjust parameters such as the gain. For example, a camera may be positioned in a scene with little light. The camera may initially increase the gain to increase the sensitivity of the sensor to capture the low level of light. However, a high gain produces noise that resembles motion. The resulting high gain image may increase the blurriness due to the perceived motion and require a high bit rate to capture the motion. To address this, the camera may compensate by lowering the gain. Additionally, the camera may also apply a low pass filter to remove the noise using a digital signal processor.

The parameters described above may be determined by the system using cloud-based computing resources. That is, encoded video may be transmitted to the cloud-based computing resource for evaluation and analysis described above. The evaluation and analysis produces updated parameters for the camera. The parameters are then transmitted from the cloud-based computing resource to the camera system. Specifically, the parameters may be transmitted to each individual cameras. In some embodiments, the parameters may be transmitted to a base station associated with the cameras. The base stations may store the parameters and transmit the parameters to the associated cameras when the cameras wake up from sleep mode.

In addition to performing training steps, the network-connected surveillance system can also perform feedback steps. The surveillance system receives user feedback indicating the user's perception of the quality of the video. For example, the user may use an interface to provide a score, narrative, or other indication of the perceived quality of the recorded video. The interface may be accessible via a web browser, mobile application, desktop application, or over-the-top (OTT) application. If untrained customer reports an issue on a video, the video may be checked manually by technical support and then incorporated as training material. Additionally, the reported issues from untrained customer may also be filtered by software that can look for specific issues.

Figure 6:
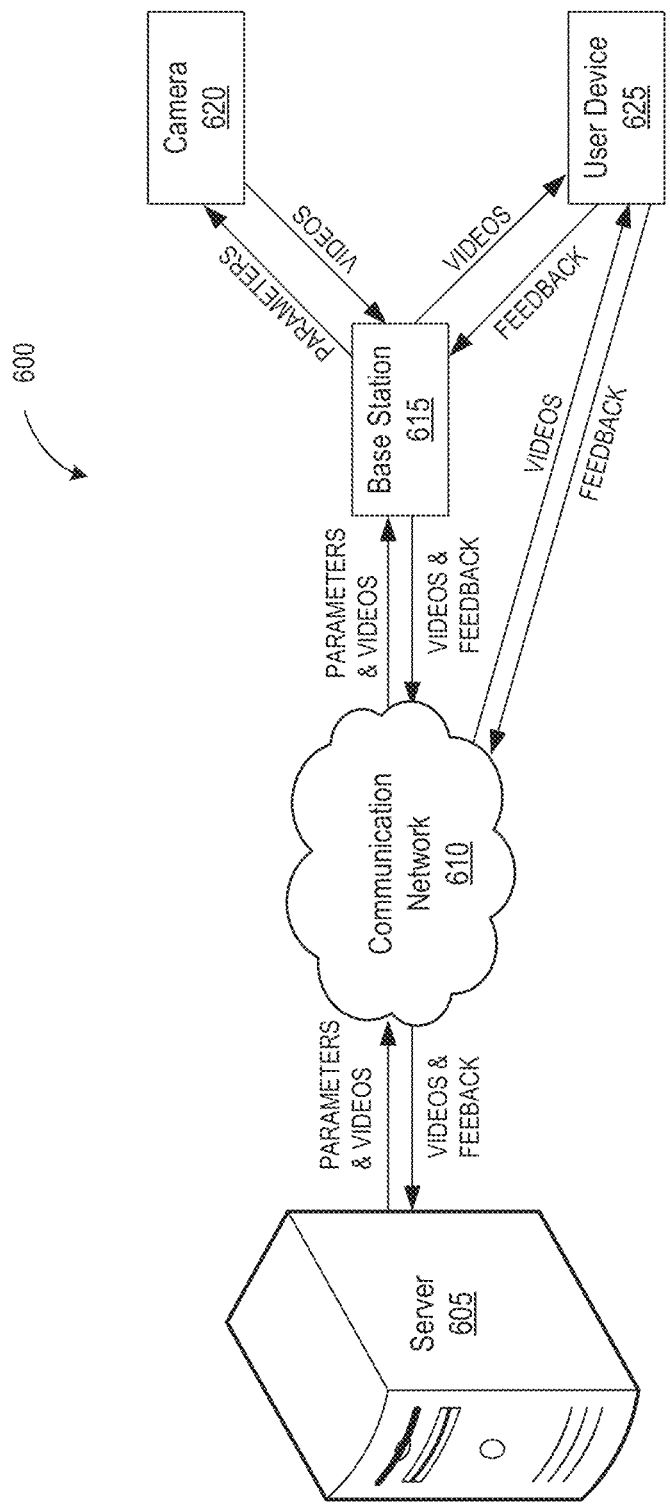
FIG. 6 is a high-level flow diagram of a technique for updating one or more parameters of an electronic device.

FIG. 6 is a high-level system diagram of a surveillance system that iteratively updates one or more parameters of an electronic device, such as a camera. The flow diagram depicts possible exchanges of video data, camera parameters, and user feedback between various components of a network-connected surveillance system 600. Network-connected surveillance system 600 includes server 605, communications network 610, base station 615, camera 620, and user device 625. In some embodiments, the network-connected surveillance system 600 may include more than one of each of the components depicted. For example, network-connected surveillance system 600 may include more than one camera or more than one user device.

Camera 620 provides video data to base station 615. In turn, the base station 615 may transmit at least some of the video data to server 605 via communication network 610. Server 605 may analyze the video data in a manner consistent with the descriptions above and transmit updated parameters to base station 615 and/or camera 620. Additionally or alternatively, base station 615 may analyze the video data in a manner consistent with the descriptions above and transmit updated parameters to camera 620. In some embodiments, the base station 615 may store the parameters for transmission to camera 620 when camera 620 wakes up from a sleep state. Additionally, the video data from camera 620 may be transmitted to user device 625 (e.g., directly or indirectly via base station 615) or to server 605 via communication network 610. A user of user device 625 may view the video data and provide feedback data to base station 615, server 605, or camera 620.

For example, camera 620 may take a video of the environment outside the front door of a residential home. Camera 620 may then transmit the video data to user device 625. From which, a user may provide feedback to the server 605 via communication network 610. The feedback, for example, may be that the video is blurry. Based on the user feedback, the server 605 may optimize parameters, such as resolution, of camera 620 using the methods described herein. The optimized parameters will be sent to camera 620 via the communication network 610 and base station 615. Upon receipt, the camera 620 may take higher resolution videos. This process may iterate until optimal videos are captured by camera 620. Additionally, the various components of the system may communicate with each other via separate networks that are not shown here. For example, the camera 620 and user device 625 may communicate with base station 615 via separate Bluetooth communication channels or WiFi communication channels, while base station 615 may communicate with server 605 via the Internet.

In another embodiment, camera 620 and base station 615 can be incorporated within the same device. Multiple devices can be used in this manner, such as a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device. For example, an individual can use an iPhone to take a video. After which, the iPhone can function as base station 615 to transmit and receive the video and parameters from the server and user device. as mentioned above.

Figure 7:
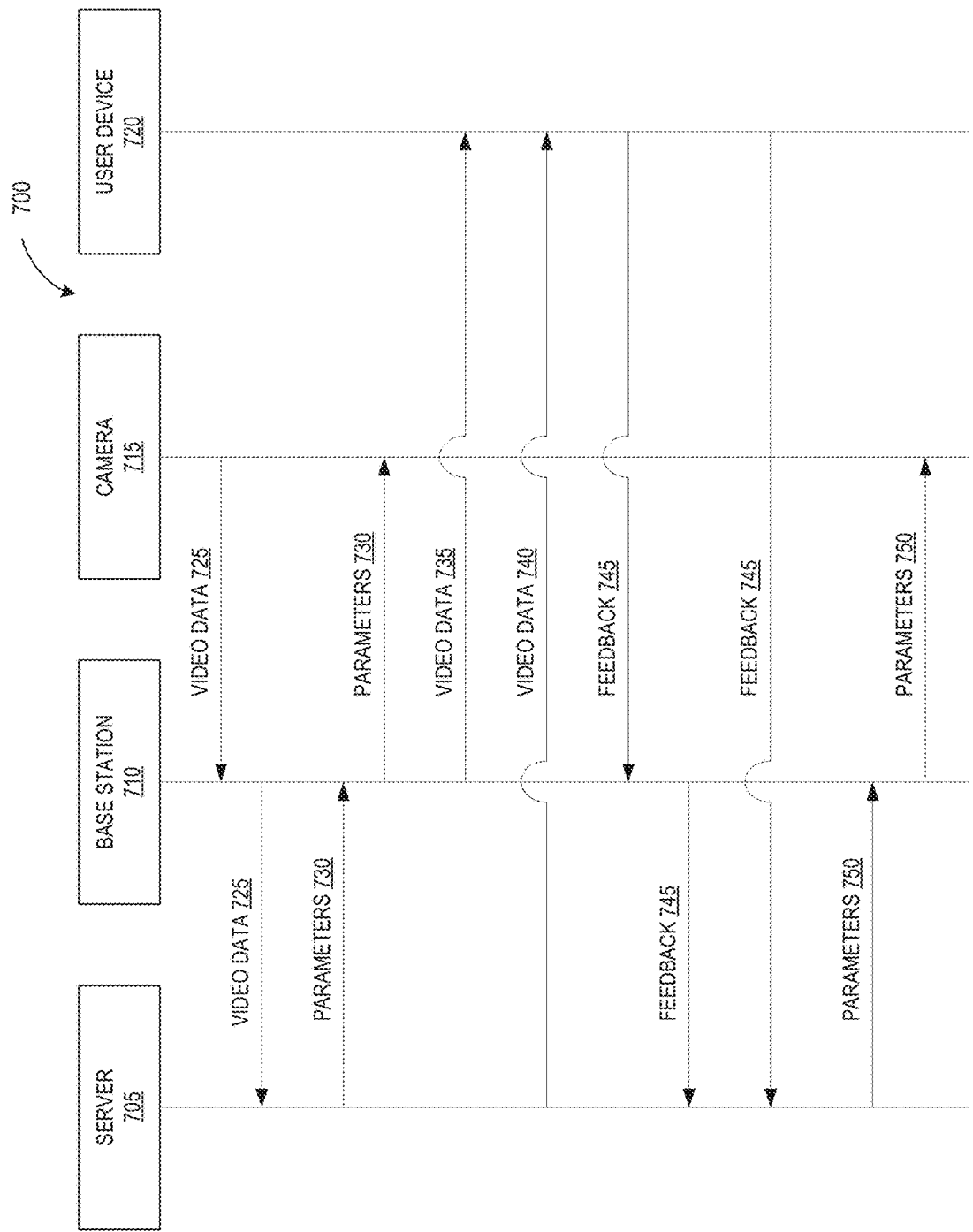
FIG. 7 is a sequence diagram of a technique for updating one or more parameters of an electronic device.

FIG. 7 is a sequence diagram of a technique 700 for updating one or more parameters of an electronic device. The sequence diagram depicts the communication between server 705, base station 710, camera 715, and user device 720. In some embodiments, the communication between server 705, base station 710, camera 715, and user device 720 may be implemented as a network-connected surveillance system. In some embodiments, the network-connected surveillance system 700 may include more than one of each of the components depicted. For example, the network-connected surveillance system may include more than one camera or more than one user device. In some embodiments, the technique 700 may be performed by the surveillance system 600 of FIG. 6.

First, camera 715 may provide video data 725 to base station 710. In turn, base station 710 may relay the video data 725 to server 705. Server 705 may analyze video data 725 and produce parameters 730 that affect the operation of camera 715. Parameters 730 are then transmitted to base station 710. In some embodiments, base station 710 immediately transmits the received parameters 730 to camera 715. In other embodiments, base station 710 stores the received parameters 730. When base station 710 determines that camera 715 has awoken from a sleep mode, it will transmit the parameters 730 to camera 715.

Additionally, video data 735 and 740 originating from camera 715 may be stored at base station 710 and server 705, respectively. Video data 735 and/or 740 may be transmitted from base station 710 and server 705, respectively, to user device 720. The user device 720 may be any device capable of displaying video to be viewed by a user. In some embodiments, the user device 720 is a mobile device capable of viewing video data. Once user device 720 receives video data 735 and/or 740, the user device 720 may view the video stream and provide feedback assessing the quality of the video data. User device 720 transmits feedback 745 to base station 710. The base station 710 may in turn transmit feedback 745 to server 705. Alternatively or additionally, user device 720 may transmit feedback 745 directly to server 705 without using base station 710.

Server 705 may analyze feedback 745 and produce parameters 750 that affect the operation of camera 715. Parameters 750 are then transmitted to base station 710. Similar to parameters 730 described above, base station 710 may immediately transmit the received parameters 750 to camera 715. In other embodiments, base station 710 stores the received parameters 750. When base station 710 determines that camera 715 has awoken from a sleep mode, it will transmit the parameters 750 to camera 715. In some embodiments, the image quality evaluation models discuss herein may be used.

Figure 8:
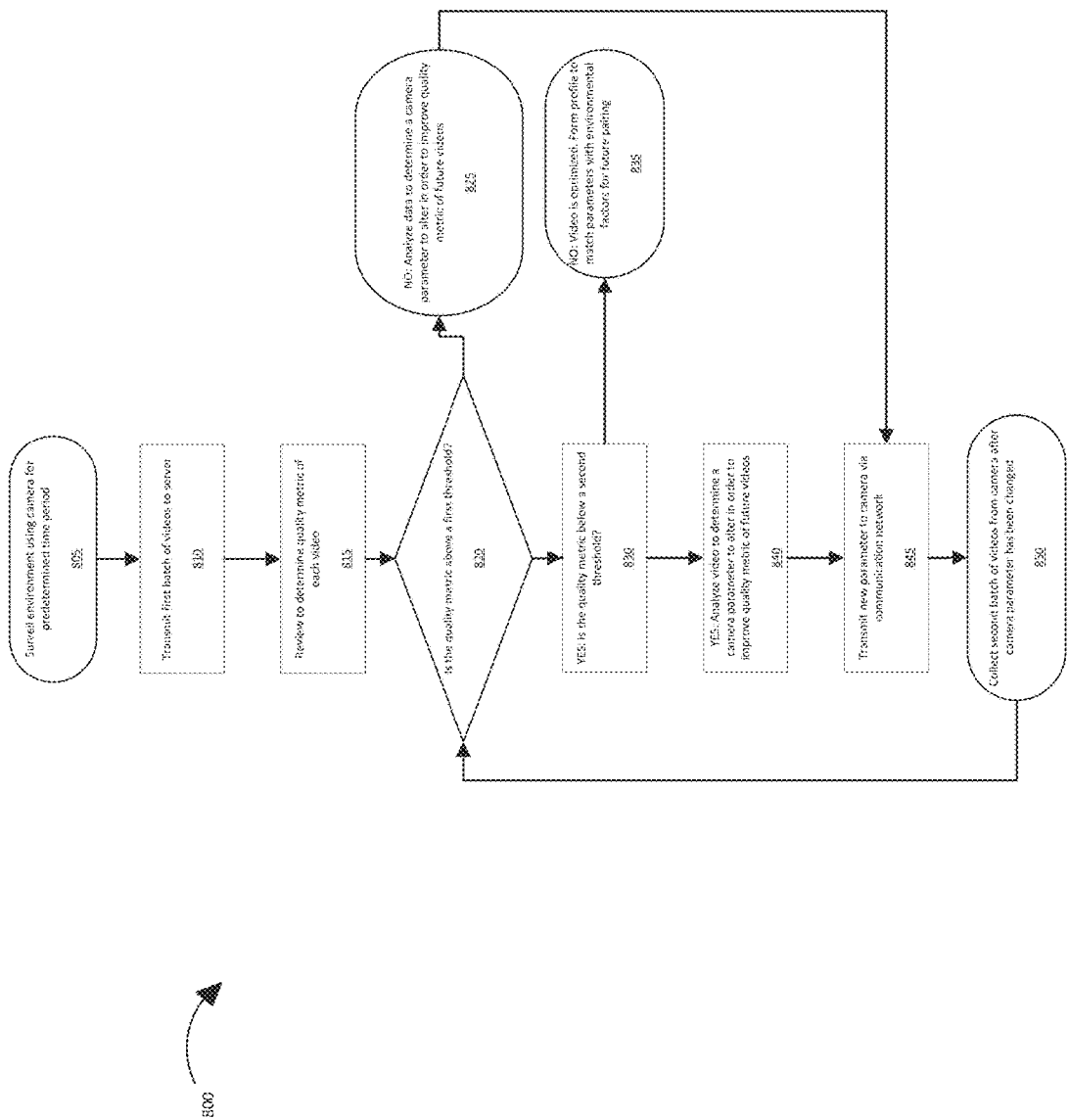
FIG. 8 is a block diagram illustrating an example of a processing system in which at least some operations described herein can be implemented.

FIG. 8 depicts a flow diagram of a process 800 that may be performed by a surveillance system. In step 805, a camera system surveils an environment for a predetermined time period. In step 810, the batch of videos collected for that time period is sent to the server. The camera system can transmit the video data to the server via the base station and communication network. As mentioned above, the base station and camera may be two separate devices or incorporated within the same device, such as a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

In step 815, the analytics system determines the quality metric of each video in the batch of videos. The analytics system can be a part of the server. As mentioned above with regards to the base station, the server can also be a separate device or be a part of a larger system. For example, a smartphone can be used as the surveillance mechanism, the base station, and the analytics system.

The quality metric can be a numeric representation of the user's perceived quality. For example, the quality metric can be a summation of or based on several quality factors such as blurriness, hue, contrast, pixel distortion, data compression, brightness, etc. In another example, the quality metric can be based on subjective quality tests such as single or multiple stimulus procedures. These procedures are, preferably, done during the pre-launch training phase. However, they can be performed at a later stage as the system iteratively assesses the quality of the videos.

In step 820, the system determines if the quality metric of each video is above a first threshold. As discussed herein, the first threshold can be, for example, the result of pre-launch training, profiles, or based on user feedback. If the quality metric is not above a first threshold, the system will proceed to step 825. In step 825, the system will determine which camera parameter(s) to alter to improve the quality metric of future videos. After which, the process will jump to step 845, where the parameter change instruction will be sent to the camera. Conversely, if the quality metric is above a first threshold, in step 830, the system will determine whether the quality metric is below a second threshold. If the quality metric is not below the second threshold, under step 835, the system determines that the video has been optimized and can make a profile. A profile, as described herein, can contain environmental characteristics, the optimized parameters, etc. Thus, in the future, if the system determines that a camera is surveilling an environment that is similar to a previously surveilled environment and for which the system was optimized, the system can use similar parameters for the current environment. Conversely, if the quality metric is below a second threshold, under step 840, the system will determine which camera parameter(s) to alter to make future videos have a higher quality metric. After determining the parameter(s), the instruction is sent to the camera in step 845. In step 850, the camera operates under the newly received parameters and collects a second batch of videos. After which, the process repeats with step 820.

Processing System

Figure 9:
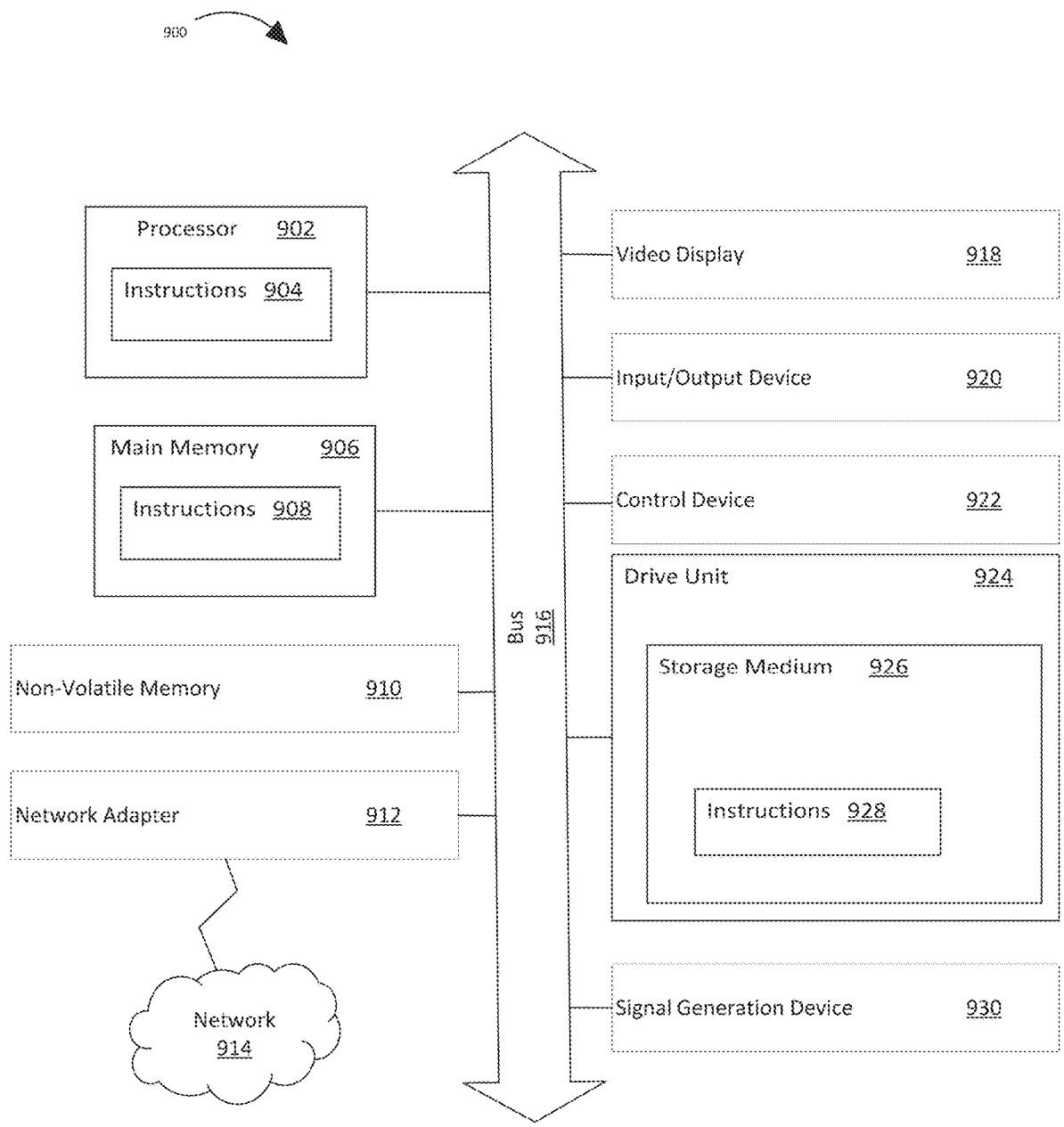
FIG. 9 is a flowchart of a process for updating the parameters of a camera.

FIG. 9 is a block diagram illustrating an example of a processing system 900 in which at least some operations described herein can be implemented. For example, some components of the processing system 900 may be hosted on an electronic device (e.g., electronic device 200 of FIG. 2A), a base station (e.g., base station 250 of FIG. 2B), or a network-accessible server system (e.g., network-accessible server system 406 of FIG. 4A-B).

The processing system 900 may include one or more central processing units ("processors") 902, main memory 906, non-volatile memory 910, network adapter 912 (e.g., network interface), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computing device. When read and executed by the one or more processors 902, the instruction(s) cause the processing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method for autonomously managing a camera based on assessments of the quality of videos generated by the camera, the method comprising:
   acquiring a first batch of videos generated by a camera over a first interval of time;
   establishing a quality metric for each video in the first batch of videos, the quality metric comprising a local image structure and a luminance for the each video, wherein the establishing uses a model trained on a database of videos with known distortions, the model using scene statistics to quantify losses of quality in the videos from the distortions;
   identifying each video in the first batch of videos whose quality metric exceeds a first threshold;
   determining that a number of videos in the first batch of videos whose quality metrics exceed the first threshold fall beneath a second threshold;
   identifying a parameter of the camera to be altered to improve the quality of future videos generated by the camera;
   generating an instruction for causing the parameter to be altered to a first value; and
   causing transmission of the instruction to the camera via a wireless communication channel.

2. The computer-implemented method of claim 1, wherein the quality metric is indicative of perceived quality of audio and visual data generated by the camera.

3. The computer-implemented method of claim 1, wherein the parameter is an optical parameter, an image processing parameter, or an encoding parameter.

4. The computer-implemented method of claim 1, wherein said establishing comprises:
   applying a reference-less model that considers as input pixel data or parametric data of each video in the first batch of videos.

5. The computer-implemented method of claim 1, wherein the first and second threshold values are based on feedback provided by an individual, a constraint specified in a profile, a metric produced by an image quality assessment operation, or any combination thereof.

6. The computer-implemented method of claim 1, wherein the first and second thresholds are predetermined values.

7. The computer-implemented method of claim 1, wherein the instruction sent to the camera is based on a level of similarity between an observed environment and a previously observed environment.

8. The computer-implemented method of claim 1, wherein the quality metric is a numeric representation of hue, blurriness, contrast, saturation, brightness, or any combination thereof.

9. The computer-implemented method of claim 1, wherein the first batch of videos acquired from the camera is accompanied by data indicative of light source events, motion sensor events, audio events, or any combination thereof.

10. The computer-implemented method of claim 1, further comprising:
    acquiring a second batch of videos generated by the camera over a second interval of time,
      wherein the second interval of time follows receipt of the instruction by the camera;
    establishing a quality metric for each video in the second batch of videos;
    identifying each video in the second batch of videos whose quality metric exceeds the first threshold;
    determining that a number of videos in the second batch of videos whose quality metric exceeds the first threshold falls beneath the second threshold;
    generating another instruction for causing the parameter to be altered to a second value different than the first value; and
    causing transmission of the other instruction to the camera via the wireless communication channel.

11. The computer-implemented method of claim 1, further comprising:
    acquiring a second batch of videos generated by the camera over a second interval of time,
      wherein the second interval of time follows receipt of the instruction by the camera;
    establishing a quality metric for each video in the second batch of videos;
    identifying each video in the second batch of videos whose quality metric exceeds the first predetermined threshold;
    determining that a number of identified videos in the second batch of videos whose quality metric exceeds the first threshold exceeds the second threshold; and
    indicating in a profile associated with the camera that the camera is generating videos of sufficient quality.

12. The computer-implemented method of claim 11, wherein the profile specifies the parameter, a current value for the parameter, an environmental characteristic of an area observed by the camera, a geographic location of the camera, or any combination thereof.

13. An electronic device comprising:
a network interface for communicating with a camera over a wireless communication channel;
a processor; and
a memory having instructions stored thereon that, when executed by the processor, cause the processor to:
   process a batch of videos received from the camera via the network interface,
      wherein the batch of videos are captured by the camera with a parameter set to a first value,
   establish a quality metric for each video in the batch of videos, the quality metric comprising a local image structure and a luminance for the each video, wherein establishing the quality metric uses a model trained on a database of videos with known distortions,
   select a second value for the parameter based on the first value, the quality metric, or any combination thereof, and
   transmit an instruction to the camera to cause the parameter to be altered to the second value.

14. The electronic device of claim 13, wherein the instructions further cause the processor to:
   determine, based on the quality metric, that the camera is producing videos of sufficient quality.

15. The electronic device of claim 14, wherein the second value is equivalent to the first value for the parameter.

16. The electronic device of claim 13, wherein the parameter further comprises an exposure, an aperture, and an analog gain.

17. The electronic device of claim 13, wherein the parameter further comprises a gamma encoding.

18. The electronic device of claim 13, wherein the parameter further comprises an auto focus.

19. The electronic device of claim 13, wherein the parameter further comprises a sharpness.

20. The electronic device of claim 13, wherein the parameter further comprises a color temperature.

* * * * *